United States Patent Office 3,125,667
Patented Mar. 17, 1964

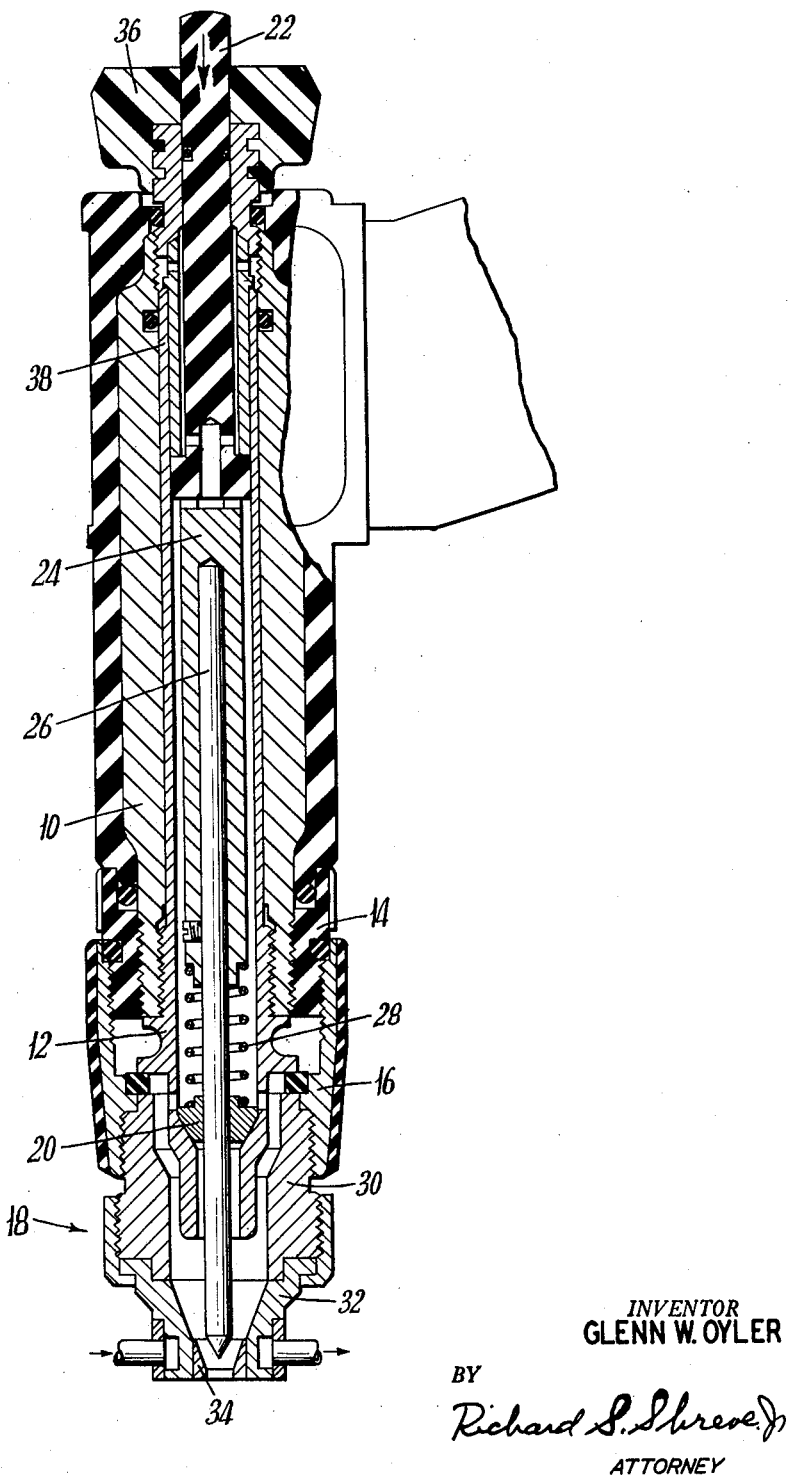

3,125,667
ARC TORCH PUSH STARTING
Glenn W. Oyler, Springfield, N.J., assignor to Union Carbide Corporation, a corporation of New York
Filed Sept. 4, 1957, Ser. No. 682,025
6 Claims. (Cl. 219—75)

This invention relates to arc torch push starting, and more particularly to apparatus for striking the arc and initiating the operation of the arc torch according to the copending application of R. M. Gage, Serial No. 524,353, now Patent No. 2,806,124.

The constricted arcs of transferred and non-transferred arc torch processes have previously been initiated by super-imposing a high frequency potential onto the D.C. or A.C. potential applied between the electrodes. This procedure has several major disadvantages: it requires a separate, expensive source of high frequency power; it requires additional insulation in the torch apparatus; and it interferes with radio and television reception in the immediate vicinity. In some commercial applications of the arc torch process the high frequency power has been rendered ineffective for arc initiation due to conductance by minerals in the torch cooling water.

The main objects of the present invention are to avoid the difficulties referred to above, and to provide method and apparatus to employ relative motion of structural parts for the starting expedient.

The torch shown in the drawing is an adaptation of that shown in Behnke et al. Patent No. 2,685,632 and comprises a barrel 10 having a central bore into the bottom of which is screwed a collet body 12. Mounted on the bottom of the barrel 10 by means of a gasketed and threaded insulating bushing 14 is a water jacket 16, to the bottom of which is secured a suitably gasketed nozzle assembly 18.

In the form shown, in lieu of the collet, an electrode guide bushing 20 is fitted into the tapered seat of the bottom of the bore of the collet body 12, and a manually operated plunger 22 is slidably mounted in the upper portion of the bore of the collet body above the guide bushing 20. The plunger 22 carries a depending electrode holder 24 bored to receive the electrode 26, and a coil compression spring 28 is interposed between the bottom of the holder 24 and the top of the bushing 20 in position surrounding the electrode depending from the holder and slidably passing through the bushing.

The nozzle assembly 18 is an adaptation of that shown in Kane and Hill application Serial No. 596,185 filed July 6, 1956, now Patent No. 2,858,412, and comprises a nozzle body 30 having a central bore into which the collet body 12 depends, and which forms an annular passage for shielding gas. A water jacket 32 is secured below the body 30, and has a downwardly converging tapered central bore into the bottom of which is fitted a removable and replaceable constricted orifice member 34 preferably constructed of tungsten. In the form shown the diameter of the constricted orifice is about equal to the electrode diameter, and serves to wall-stabilize the arc.

The electrical connections and basic arc operation after starting are according to the copending application of R. M. Gage, Serial No. 524,353 filed July 26, 1955, now Patent No. 2,806,124.

The plunger 22 is of insulating material, and has an upper portion of reduced diameter to slide through a bore in an adjusting knob 36 screwed into the top of the barrel 10 above the top of the body 12. The top of the plunger extends through and above the knob 36 to serve as a push button. A spacer sleeve 38 surrounds the upper reduced portion of the plunger 22 and seats on an annular shoulder near the bottom of the plunger. The top of the sleeve 38 engages the bottom of the knob 36.

In setting up the torch for operation, the knob 36 is turned to push the sleeve 38 down onto the shoulder of the plunger 22, against the pressure of the spring 28. This action lowers the holder 24 and the electrode 26. The turning of the knob 36 is manually controlled to adjust the spacing of the electrode tip from the orifice member 34 for optimum ultimate operating conditions. To start the arc, after the shielding gas has been turned on, the plunger 22 is pushed down through the knob 36, and pushes the holder 24 and electrode 26 into proximate contact with the orifice member 34, and the arc is initiated. After this starting operation the plunger 22 is released, and the spring 28 retracts the electrode tip to operative distance and avoids burning of the electrode or the orifice member by overretention at the starting distance.

In a second form of the invention, applicable particularly to transferred arc torch processes wherein the workpiece is in the electrical circuit, the main arc is initiated by extending the electrode through the constricting orifice to touch the workpiece and then retracting it by means of the spring to its normal operating position. The diameter of the constricted orifice in this case is slightly larger than the electrode diameter, thus permitting the electrode to pass through the orifice without making contact. The use of this starting technique eliminates the need for a pilot arc for starting in either manual or mechanized operation. Thus, not only the pilot arc, but also the resistors and pilot-arc circuit as such pilot arc requires, are eliminated.

What is claimed is:

1. Apparatus for starting an arc torch having an arc constricting nozzle and a central electrode insulated from said nozzle and having an arcing tip normally retracted from said nozzle, which comprises plunger means for rapidly advancing said central electrode axially from such retracted position toward said arc constricting nozzle to bring the arcing end of said central electrode into starting relationship with the interior of said arc constricting nozzle and strike an arc therebetween, and spring means for then rapidly retracting said central electrode from said starting relationship.

2. Apparatus for starting an arc torch having a barrel, an electrode holder in said barrel, an arc constricting nozzle insulated from said electrode holder, means for securing an electrode in said holder with its arcing tip normally retracted from said nozzle to prevent relative movement of the electrode in said holder and to cause movement therewith as a unit, which comprises a plunger slidably mounted in said barrel and from which said electrode holder depends, for rapidly pushing the electrode tip from such retracted position into starting relationship with the interior of said arc constricting nozzle, and a coil compression spring surrounding said electrode and engaging said holder for rapidly retracting said electrode tip from starting relationship.

3. Apparatus for starting an arc torch having a barrel, an electrode holder in said barrel, and an arc constricting nozzle insulated from said electrode holder, which comprises a plunger slidably mounted in said barrel and from which said electrode holder depends, an adjusting knob screwed into the top of said barrel for adjusting the operating distance of the electrode tip from said arc constricting nozzle, said plunger extending through and above said knob for pushing the electrode tip into starting relationship with the interior of said arc constricting nozzle, and a coil compression spring engaging said holder for retracting said electrode tip from starting relationship.

4. Apparatus for starting an arc torch having a barrel, an electrode holder in said barrel, and a nozzle having an arc constricting orifice and isolated from said electrode holder, which comprises a plunger slidably mounted in said barrel and from which said electrode depends, said plunger having an insulated portion extending above said barrel to serve as a push button for rapidly advancing said electrode holder to push the arcing end of the electrode through said constricted orifice into starting relationship with a workpiece to strike an arc therebetween, and means for then rapidly retracting said electrode through said constricted orifice to a position thereabove.

5. Method of starting an arc torch having a barrel, an electrode holder in said barrel, and a nozzle having an arc constricting orifice and insulated from said electrode holder; which comprises manually rapidly advancing said electrode holder to push the arcing tip of the electrode through said constricted orifice into starting relationship with a workpiece to strike an arc therebetween, and then retracting said electrode through said constricted orifice to a position thereabove while maintaining said arc therebetween.

6. Apparatus for starting an arc torch having a barrel with a collet body in said barrel having a bore with a tapered seat at the bottom, said torch having an arc constricting nozzle insulated from said collet body, which apparatus comprises an electrode guide bushing fitted into said tapered seat, a manually operated plunger slidably mounted in the bore of said collet body above said electrode guide bushing, an electrode holder depending from said plunger for receiving an electrode slidably passing through said guide bushing, and a coil compression spring interposed between the bottom of said holder and the top of said guide bushing and surrounding an electrode depending from said holder.

References Cited in the file of this patent
UNITED STATES PATENTS

| | | |
|---|---|---|
| 1,002,721 | Mathers | Sept. 5, 1911 |
| 2,721,923 | Anderson | Oct. 25, 1955 |
| 2,798,145 | Vogel | July 2, 1957 |
| 2,799,769 | Vogel | July 16, 1957 |
| 2,806,124 | Gage | Sept. 10, 1957 |
| 2,845,525 | Groener et al. | July 29, 1958 |
| 2,863,984 | Schaefer et al. | Dec. 9, 1958 |
| 2,898,441 | Reed et al. | Aug. 4, 1959 |